United States Patent [19]
Matthews et al.

[11] Patent Number: 5,762,109
[45] Date of Patent: Jun. 9, 1998

[54] DUCT WITH REPLACEABLE INSULATING DUCT LINERS AND METHOD OF MAINTAINING THE SAME

[75] Inventors: Kent R. Matthews, Littleton; Eric G. Schakel, Sedalia, both of Colo.

[73] Assignee: Johns Manville International, Inc., Denver, Colo.

[21] Appl. No.: 442,431

[22] Filed: May 16, 1995

[51] Int. Cl.⁶ .................................................. F16L 9/14
[52] U.S. Cl. ................... 138/149; 138/157; 138/155; 138/DIG. 4
[58] Field of Search .................. 138/149, 148, 138/156, DIG. 4, 155, 157; 285/45, 47, 48

[56] References Cited

U.S. PATENT DOCUMENTS

| | | | |
|---|---|---|---|
| 2,108,159 | 2/1938 | Barman | 138/DIG. 4 X |
| 2,160,009 | 5/1939 | Walker | 138/DIG. 4 X |
| 2,650,180 | 8/1953 | Walker | 138/149 |
| 3,117,902 | 1/1964 | Holzheimer | 138/149 X |
| 3,336,951 | 8/1967 | Huelster | 138/149 X |
| 3,557,840 | 1/1971 | Maybee | 138/149 |
| 3,559,694 | 2/1971 | Volberg | 138/149 X |
| 3,614,967 | 10/1971 | Royston | 138/149 X |
| 3,682,824 | 8/1972 | Creaser | 138/149 X |
| 3,687,168 | 8/1972 | Sherman et al. | 138/DIG. 4 X |
| 4,192,352 | 3/1980 | Hakamada et al. | 138/149 |
| 4,287,245 | 9/1981 | Kikuchi | 138/149 X |
| 5,549,942 | 8/1996 | Watts | 138/DIG. 4 X |

FOREIGN PATENT DOCUMENTS

| | | | |
|---|---|---|---|
| 2832344 | 1/1980 | Germany | 138/149 |

*Primary Examiner*—Patrick F. Brinson
*Attorney, Agent, or Firm*—Robert D. Touslee

[57] ABSTRACT

A duct for gas flow applications is provided with a replaceable insulating duct liner that can be axially inserted into and removed from a tubular shell of the duct. Preferably, the replaceable insulating duct liners comprise fibrous and/or cellular insulation materials. Duct systems using duct sections with replaceable insulating duct liners can be maintained by removing duct sections from the system; removing the replaceable insulating duct liners from the duct sections; inserting new replaceable insulating duct liners into the duct sections; and replacing the duct sections into the duct system.

31 Claims, 2 Drawing Sheets

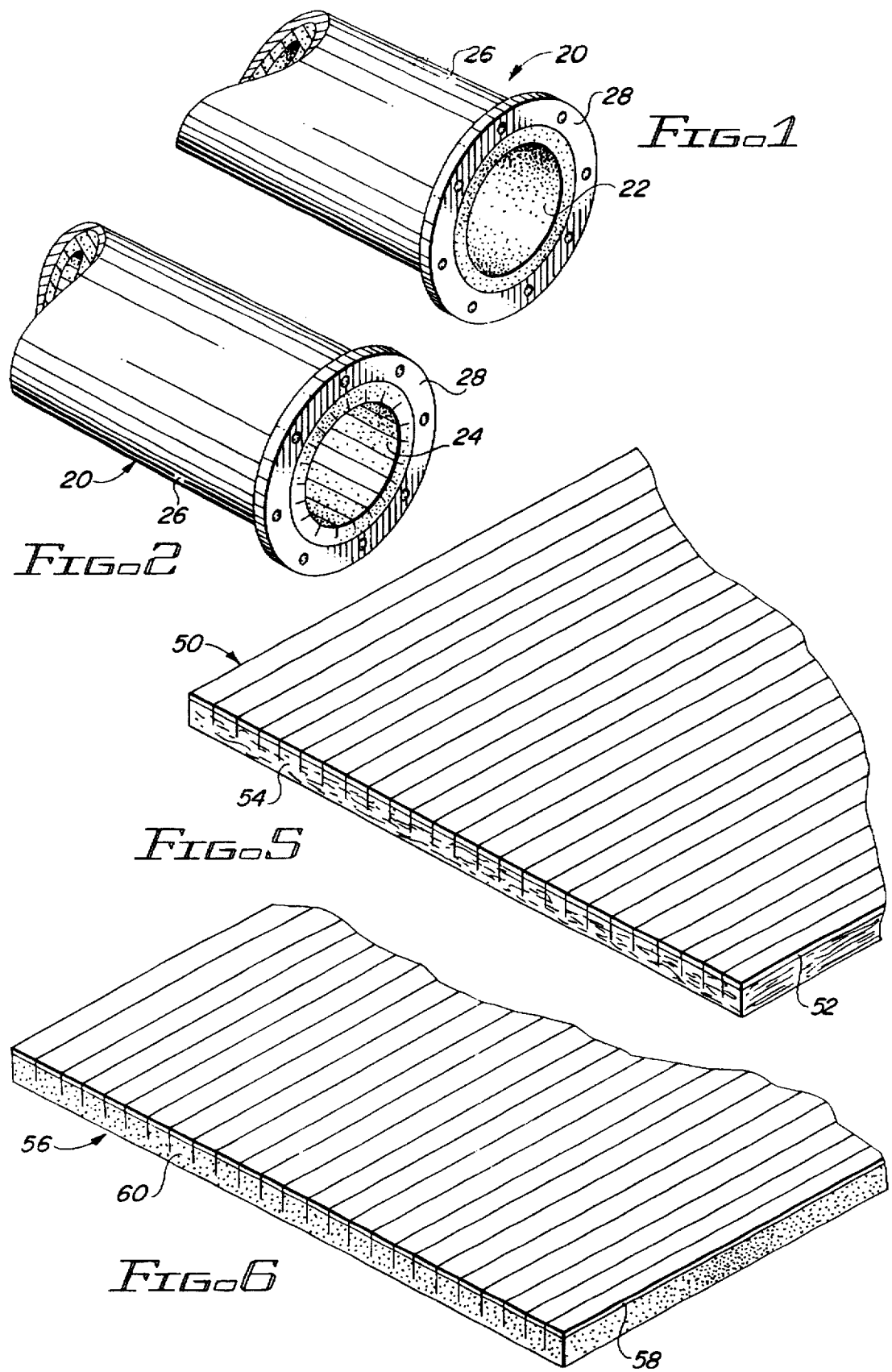

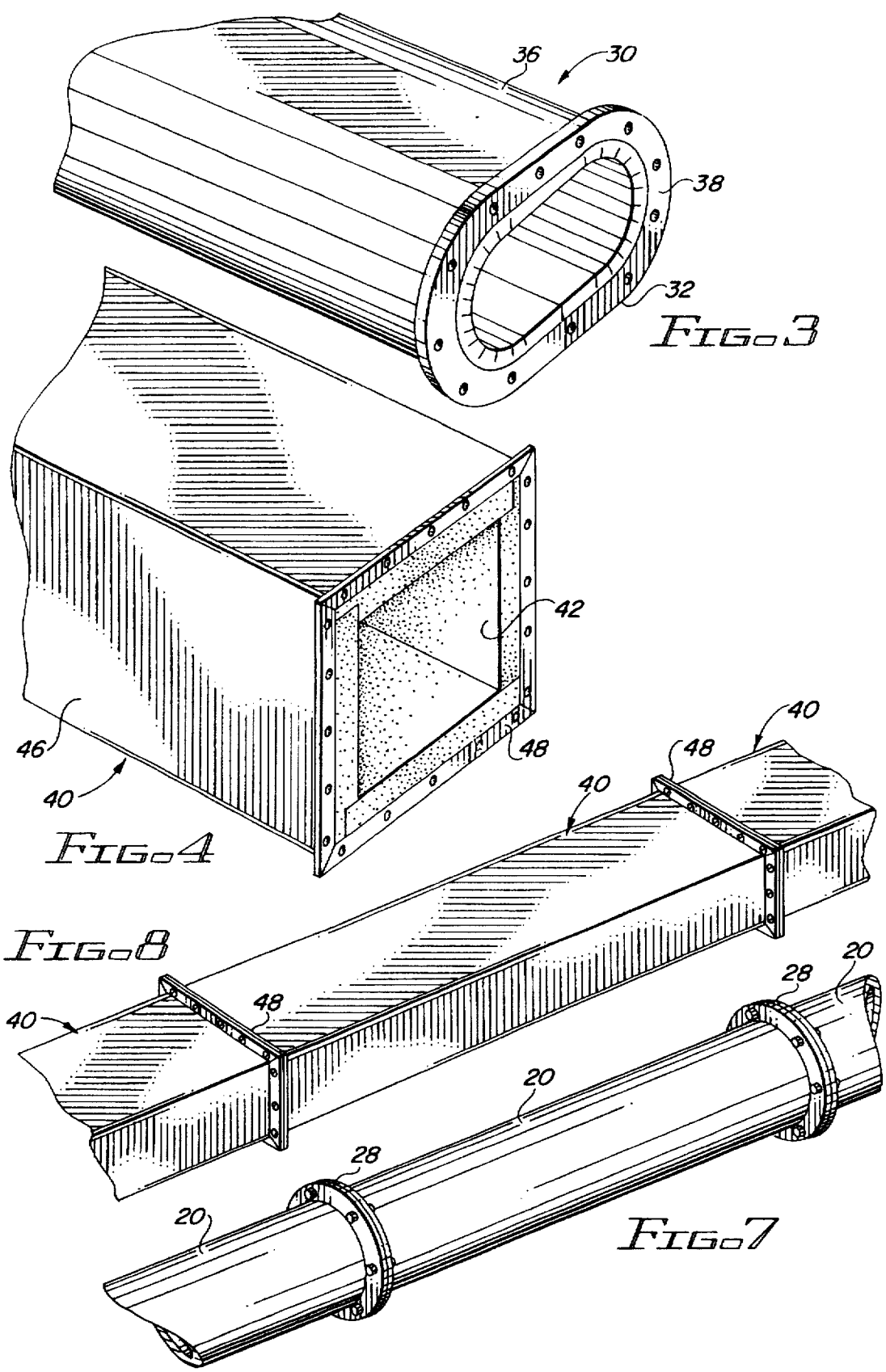

DUCT WITH REPLACEABLE INSULATING DUCT LINERS AND METHOD OF MAINTAINING THE SAME

BACKGROUND OF THE INVENTION

The present invention relates to ducts and duct systems for gas flow heating, air conditioning, ventilation, exhaust and similar applications, and, in particular, to such ducts and duct systems wherein the ducts are provided with replaceable insulating duct liners.

Duct systems for conveying gases, such as conditioned air, exhaust gases, ventilating air, etc. are frequently insulated with insulating duct liners for acoustical, thermal and/or environmental reasons. These duct systems are used in industrial, commercial, residential and similar applications including, but not limited to, heating, ventilating and air conditioning applications, exhaust gas applications, etc. However, the insulating duct liners currently used in these duct systems are permanently secured to the inner surfaces of the outer tubular shells of the duct sections or are located within inner and outer tubular shells of the duct sections (double wall duct designs) and can not be removed from the duct sections.

Under certain conditions, the inability to remove the insulating duct liners from the duct sections of a duct system can present a problem when seeking to maintain the environmental or other performance characteristics of the air or gas flow system. In a system which handles dirty or contaminated air or other gases, the insulating duct liners must be periodically cleaned to remove the dirt, microbial contamination or other contamination accumulated on the duct liner surfaces and/or entire duct sections including the sheet metal shells must be replaced. In addition, a system which normally handles relatively clean and uncontaminated air or gases but is accidentally exposed to dirty or contaminated air or gases, can also require a cleaning of the insulating duct liner and/or replacement of entire duct sections including the tubular sheet metal shells. Accordingly, there has been a need to minimize the time and expense involved in maintaining such air and gas handling systems including the time and expense involved in shutting down an air or gas handling system to clean such duct sections or the expense involved in replacing whole duct sections including the sheet metal shells.

SUMMARY OF THE INVENTION

The present invention provides a solution to the problems encountered and discussed above in previous duct systems for gas flow applications. The duct sections of the present invention have replaceable insulating duct liners that can be axially inserted into and removed from the tubular outer shells of the duct sections. The replaceable insulating duct liners are preferably formed from fibrous or cellular insulation materials which have been pre-molded or kerfed and formed into configurations complementary to the inner dimensions of the outer tubular shells of the duct sections so that the replaceable insulating duct liners can be easily and quickly inserted into and removed from the outer tubular shells of the duct sections. The inner surfaces of replaceable insulating duct liners, which are exposed to the air or gas flow, may have the inner surfaces of the insulation material exposed to the air or gas flow or may have the inner surfaces of the insulation material coated, provided with facings or otherwise provided with a surface suitable for handling the air or gas flow.

Duct systems for gas flow applications, which use the duct sections of the present invention, can be easily, quickly and relatively inexpensively maintained by utilizing access openings or removing one or more duct sections from a system; removing the replaceable insulating duct liners from the outer tubular shells of the duct sections; inserting new replaceable insulating duct liners into the outer tubular shells of the duct sections; and closing the access openings or placing the duct sections back into the duct system. Thus, the time and expenses involved in cleaning insulating duct liners of duct systems is avoided and the expenses involved in replacing whole duct sections, including the sheet metal tubular shells, is avoided where the insulating duct liners have been damaged or can not be satisfactorily cleaned due to microbial or other contamination.

BRIEF DESCRIPTION OF THE DRAWINGS

FIG. 1 is a partial perspective view of a duct having a round outer tubular shell with a preformed round replaceable insulating duct liner inserted into the tubular shell.

FIG. 2 is a partial perspective view of a duct having a round outer tubular shell with a kerfed round replaceable insulating duct liner inserted into the tubular shell.

FIG. 3 is a partial perspective view of a duct having a flat oval outer tubular shell with a kerfed flat oval replaceable insulating duct liner inserted into the tubular shell.

FIG. 4 is a partial perspective view of a duct having a rectangular outer tubular shell with a kerfed rectangular replaceable insulating duct liner inserted into the tubular shell.

FIG. 5 is a perspective view of a rigid, coated, fibrous insulation board kerfed to be formed into a round replaceable insulating duct liner.

FIG. 6 is a perspective view of a rigid, faced, cellular insulation board kerfed to be formed into a round replaceable insulating duct liner.

FIG. 7 is a perspective view of a portion of a duct system with round duct sections having replaceable insulating duct liners.

FIG. 8 is a perspective view of a portion of a duct system with rectangular duct sections having replaceable insulating duct liners.

DESCRIPTION OF THE PREFERRED EMBODIMENTS

The ducts and duct systems of the present invention are used to convey air and other gases in industrial, commercial and residential applications such as, but not limited to, heating, ventilating and air conditioning applications, exhaust applications, etc. Outer tubular shells of the ducts typically have a round, flat oval or rectangular transverse cross section and are lined with replaceable insulating duct liners for acoustical, thermal and environmental purposes.

The replaceable insulating duct liners of the present invention are preferably made of cellular or fibrous insulation materials or a composite of cellular and fibrous insulation materials. Insulation materials, such as, but not limited to, the following insulation materials may be used to form the replaceable insulating duct liners of the present invention: preformed, molded glass fiber liners; preformed, molded, cellular foam liners (e.g. polyimide foam); rigid, high density, glass fiber boards; rigid, high density, cellular foam boards (e.g. polyimide foam); etc. The glass fiber insulating duct boards used to form the insulating duct liners of the present invention are preferably from one to four inches thick and have densities ranging from about 2.4 to about 4.5 lbs/cu. ft.

The preformed, molded cellular and/or fibrous replaceable insulating duct liners of the present invention are molded to the desired round cross section or fabricated to the desired flat oval or rectangular cross section of the desired thickness, outer dimensions, and length. Preferably, the preformed replaceable insulating duct liners are rigid enough that there is no sagging or substantially no sagging of the preformed, replaceable insulating duct liners along their lengths when the preformed replaceable insulation liners are housed within the outer tubular shells of the ducts so that the flow of air or other gases through the ducts is not impeded by the liners. For certain duct configurations (e.g. very short non-standard lengths of duct) and fittings where the insulating duct liner must be cut into small sections, mechanical fasteners and/or adhesives may be used to secure the insulating duct liner to the duct or fitting. However, even in this instance, the certain duct configurations or fittings utilizing the insulating duct liners of the present invention will typically require only about 10% of the mechanical fasteners or adhesives normally used in such systems. Preferably, the outer dimensions of the preformed replaceable insulating duct liners (e.g. the diameters or the heights and widths) are substantially equal to but somewhat less than the corresponding inner dimensions of the outer tubular shells of the ducts to permit the preformed replaceable insulating duct liners to be easily and quickly inserted into or removed from the outer tubular shells of the ducts.

The kerfed cellular and/or fibrous replaceable insulating duct liners of the present invention are formed to the desired round, flat oval or rectangular shape and outer dimensions by appropriately kerfing a cellular and/or fibrous insulation board and forming the kerfed insulation board into the desired shape. While rectangular kerfs are preferred, a variety of longitudinally extending kerfs are used, such as, but not limited to, rectangular, shiplap, vee, overlapping corner kerfs, etc., to give the insulating duct boards the flexibility to be formed into the desired round, flat oval or rectangular shape. The thickness and the length of the kerfed replaceable insulating duct liner formed are governed by the thickness and length of the insulation board.

Preferably, the kerfed replaceable insulating duct liners are rigid enough that there is no sagging or substantially no sagging of the kerfed replaceable insulating duct liners along their lengths when the kerfed replaceable insulating duct liners are housed within the outer tubular shells of the ducts so that the flow of air or other gases through the ducts is not impeded by the liners. Preferably, the outer dimensions of the kerfed replaceable insulating duct liners (e.g. the diameters or the heights and widths) are substantially equal to but somewhat less than the corresponding inner dimensions of the outer tubular shells of the ducts to permit the kerfed replaceable insulating duct liners to be easily and quickly inserted into or removed from the outer tubular shells of the ducts.

The inner surfaces of the cellular and/or fibrous insulation materials of the preformed or kerfed replaceable insulating duct liners of the present invention can form the inner surfaces of the replaceable insulating duct liners. The inner surfaces of the replaceable insulating duct liners can also be coated with an appropriate coating material such as, but not limited to, a polymeric coating material. The inner surfaces of the replaceable insulating duct liners can also be faced with a suitable facing material, such as but not limited to, non-combustible foils, synthetic polymeric films, metallic foil composites, non-woven glass fiber or other mats, which are adhered to the underlying insulation materials by conventional adhesives or bonding agents.

The outer tubular shells of the ducts used in the present invention are typically conventional tubular shells commonly used for industrial, commercial and residential air and gas flow applications. Such tubular shells are typically formed from sheet metal. The round or flat oval outer tubular shells are commonly formed of spirally wound sheet metal strips which are formed with a spiral seam joining successive convolutions of the sheet metal strip into the tubular shell. The duct sections may be separably joined together by male/female connectors; sleeves; outer flanges (as shown in the drawings) or by other conventional means.

FIGS. 1 and 2 show round ducts 20 with replaceable insulating duct liners 22 and 24. The outer tubular shells 26 of the round ducts 20 are provided with annular flanges 28 for joining duct sections together into a duct system for conveying air or other gas flows. While the insulating duct liners 22 and 24 could be made of a cellular insulation material, a composite cellular/ fibrous insulation material, or the like, the replaceable insulating duct liners 22 and 24, shown in FIGS. 1 and 2, are made of a fibrous insulation material such as glass fiber insulation board. The replaceable insulating duct liner 22 is a preformed, molded replaceable insulating duct liner and the replaceable insulating duct liner 24 is a kerfed replaceable insulating duct liner with rectangular shaped kerfs spaced circumferentially about the inner surface of the replaceable insulating duct liner. As discussed above, both of the replaceable insulating duct liners 22 and 24 can be slid axially into and out of the outer tubular shells 26.

FIG. 3 shows a flat oval duct 30 with a replaceable insulating duct liner 32. The outer tubular shell 36 of the flat oval duct 30 is provided with annular flanges 38 for joining duct sections together into a duct system for conveying air or other gas flows. While the replaceable insulating duct liner 32 could be made of a cellular insulation material, a composite cellular/fibrous insulation material, or the like, the replaceable insulating duct liner 32 shown in FIG. 3, is made of a fibrous insulation material such as glass fiber insulation board. The replaceable insulating duct liner 32 is a kerfed replaceable insulating duct liner with rectangular shaped kerfs spaced about the inner surface of the liner at the sides of the replaceable insulating duct liner 32. As discussed above, the replaceable insulating duct liner 32 could also be a preformed liner and can be slid axially into and out of the outer tubular shell 36.

FIG. 4 shows a rectangular duct 40 with a replaceable insulation liner 42. The outer tubular shell 46 of the rectangular duct 40 is provided with peripheral flanges 48 for joining duct sections together into a duct system for conveying air or other gas flows. While the replaceable insulating duct liner 42 could be made of a cellular insulation material, a composite cellular/fibrous insulation material, or the like, the replaceable insulating duct liner 42, shown in FIG. 4, is made of a fibrous insulation material such as glass fiber insulation board. The replaceable insulating duct liner 42 is kerfed at the corners with ship-lap kerfs. As discussed above, the rectangular replaceable insulating duct liner 42 could also be a preformed liner and can be slid axially into and out of the outer rectangular tubular shell 46.

FIG. 5 shows a fibrous insulation board 50, such as a glass fiber insulation board, coated on one surface with a polymeric or similar coating material 52 used to coat duct liners. The coated surface is kerfed, preferably with rectangular shaped kerfs 54, so that the fibrous insulation board 50 can be formed into a round replaceable insulating duct liner.

FIG. 6 shows a cellular insulation board 56, such as a polyimide foam insulation board, with a facing 58 adhered to one surface thereof. The faced surface is kerfed, preferably with a series of rectangular shaped kerfs 60, so that the cellular insulation board 56 can be formed into a round replaceable insulating duct liner.

By changing the placement and/or the types of kerfs, the fibrous and cellular insulation boards 50 and 56 can also be formed into flat oval or rectangular replaceable insulating duct liners such as the liners shown in FIGS. 3 and 4.

FIGS. 7 and 8 show portions of duct systems for conveying air and other gas flows. The duct system of FIG. 7 has a plurality of round duct sections 20 bolted or otherwise separably joined together for conveying air or other gas flows. FIG. 8 shows a plurality of rectangular duct sections 40 bolted or otherwise separably joined together for conveying air or other gas flows. Although not shown, the flat oval duct sections 30 of FIG. 3 can likewise be bolted or otherwise separably joined together for conveying air or other gas flows.

Unlike previous duct systems, rather than attempting to clean duct liner surfaces or replacing whole duct sections including the tubular shells when the duct liners of the system are contaminated or damaged, the duct systems of FIGS. 7 and 8 of the present invention can be maintained by simply removing duct sections 20, 30 or 40 from the duct system; removing the replaceable insulating duct liners from the outer tubular shells; inserting new replaceable insulating duct liners into the outer tubular shells; and replacing the duct sections 20, 30 or 40 back into the duct system. Since the replaceable insulating duct liners 22, 24, 32 and 42 can be quickly and easily slid out of and into the outer tubular shells, the maintenance of the duct systems is economical and easy to perform.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A duct for gas flow applications, comprising:
a metal, outer tubular shell having a longitudinal axis; and
a replaceable insulating duct liner within said outer tubular shell, said replaceable insulating duct liner having an inner surface over which gases being conveyed through said duct flow and having an outer surface with a configuration in conformity with an inner surface of said tubular outer shell with outer transverse dimensions of said replaceable insulating duct liner being substantially equal to but less than inner transverse dimensions of said tubular shell, said replaceable insulating duct liner being moveable in the direction of said longitudinal axis of the outer tubular shell relative to said outer tubular shell whereby said replaceable insulating duct liner can be removed from said outer tubular shell and a second replaceable insulating duct liner can be inserted into said outer tubular shell.

2. The duct of claim 1, wherein: said outer tubular shell has a substantially circular transverse cross section.

3. The duct of claim 2, wherein: said replaceable insulating duct liner comprises a fibrous insulation material.

4. The duct of claim 3, wherein: said inner surface of said replaceable insulating duct liner has a polymeric coating.

5. The duct of claim 3, wherein: said inner surface of said replaceable insulating duct liner has a facing adhered thereto selected from a group consisting of: a non-combustible foil, a polymeric film, a metallic foil composite or a non-woven mat.

6. The duct of claim 2, wherein: said replaceable insulating duct liner comprises a cellular insulation material.

7. The duct of claim 1, wherein: said outer tubular shell has a generally rectangular transverse cross section.

8. The duct of claim 7, wherein: said replaceable insulating duct liner comprises a fibrous insulation material.

9. The duct of claim 8, wherein: said inner surface of said replaceable insulating duct liner has a polymeric coating.

10. The duct of claim 8, wherein: said inner surface of said replaceable insulating duct liner has a facing adhered thereto selected from a group consisting of: a non-combustible foil, a polymeric film, a metallic foil composite or a non-woven mat.

11. The duct of claim 7, wherein: said replaceable insulating duct liner comprises a cellular material.

12. In a duct system for gas flow applications comprising separable duct sections having outer tubular shells with longitudinal axes, a method of maintaining said duct system comprising: inserting a replaceable insulating duct liner into a metal, outer tubular shell of at least one duct section of said duct sections; said replaceable insulating duct liner having an inner surface over which gases being conveyed through said duct section flow and having an outer surface with a configuration in conformity with an inner surface of said outer tubular shell with outer transverse dimensions of said replaceable insulating duct liner being substantially equal to but less than inner transverse dimensions of said outer tubular shell whereby said replaceable insulating duct liner is inserted into said outer tubular shell by sliding said replaceable insulating duct liner into said outer tubular shell; placing said one duct section in said duct system; operating said duct system by conveying a gas through said duct system including said one duct section; removing said one duct section from said duct system; removing said replaceable insulating duct liner from said outer tubular shell of said one duct section by sliding said replaceable insulating duct liner out of said outer tubular shell; inserting a second replaceable insulating duct liner into said outer tubular shell of said one duct section by sliding said second replaceable insulating duct liner into said outer tubular shell; and replacing said one duct section into said duct system.

13. The method of claim 12, wherein: a plurality of replaceable insulating duct liners are inserted into said outer tubular shells of a plurality of said duct sections by sliding said replaceable insulating duct liners into said outer tubular shells; said duct sections are placed in said duct system; said duct system is operated by conveying a gas through said duct system including said plurality of duct sections having said replaceable insulating duct liners; said plurality of duct sections are removed from said duct system; said plurality of replaceable insulating duct liners are removed from said tubular shells of said plurality of duct sections by sliding said replaceable insulating duct liners out of said outer tubular shells; a second plurality of replaceable insulating duct liners are inserted into said tubular shells of said plurality of duct sections by sliding said second plurality of replaceable insulating duct liners into said outer tubular shells; and said plurality of duct sections are replaced into said duct system.

14. The method of claim 12, wherein: said tubular shells have a substantially circular transverse cross section.

15. The method of claim 14, wherein: said replaceable insulating duct liner comprises a fibrous insulation material.

16. The method of claim 14, wherein: said replaceable insulating duct liner comprises a cellular insulation material.

17. The method of claim 12, wherein: said tubular shells have substantially rectangular transverse cross sections.

18. The method of claim 17, wherein: said replaceable insulating duct liner comprises a fibrous insulation material.

19. The method of claim 17, wherein: said replaceable insulating duct liner comprises a cellular insulation material.

20. A duct system for conveying gas flows comprising:

a plurality of separable duct sections joined together;

each of said duct sections having a metal, outer tubular shell; a replaceable insulating duct liner within said outer tubular shell; said replaceable insulating duct liner having an inner surface over which gases being conveyed through said duct flow and having an outer surface with a configuration in conformity with an inner surface of said outer tubular shell with outer transverse dimensions of said replaceable insulating duct liner being substantially equal to but less than inner transverse dimensions of said outer tubular shell; and said replaceable insulating duct liner being axially slidable relative to said outer tubular shell whereby said replaceable insulating duct liner can be removed from said outer tubular shell and a new replaceable insulating duct liner can be inserted into said outer tubular shell.

21. The duct system of claim 20, wherein: said outer tubular shells have a substantially circular transverse cross section.

22. The duct system of claim 20, wherein: said outer tubular shells have a substantially rectangular transverse cross section.

23. The duct of claim 1, wherein: said outer tubular shell has a substantially flat oval transverse cross section.

24. The duct of claim 23, wherein: said replaceable insulating duct liner comprises a fibrous insulation material.

25. The duct of claim 24, wherein: said inner surface of said replaceable insulating duct liner has a polymeric coating.

26. The duct of claim 24, wherein: said inner surface of said replaceable insulating duct liner has a facing adhered thereto selected from a group consisting of: a non-combustible foil, a polymeric film, a metallic foil composite or a non-woven mat.

27. The duct of claim 23, wherein: said replaceable insulating duct liner comprises a cellular insulation material.

28. The duct of claim 12, wherein: said outer tubular shell has a substantially flat oval transverse cross section.

29. The duct of claim 28, wherein: said replaceable insulating duct liner comprises a fibrous insulation material.

30. The duct of claim 28, wherein: said replaceable insulating duct liner comprises a cellular insulation material.

31. The duct of claim 20, wherein: said outer tubular shell has a substantially flat oval transverse cross section.

* * * * *